3,012,241
RADIO PULSE ECHO DEVICE WITH ALARM ACTUATED BY SELECTED ECHOES
Richard R. Miller, Box 369, Lakeville, Conn.
Filed Apr. 4, 1955, Ser. No. 498,976
1 Claim. (Cl. 343—7)

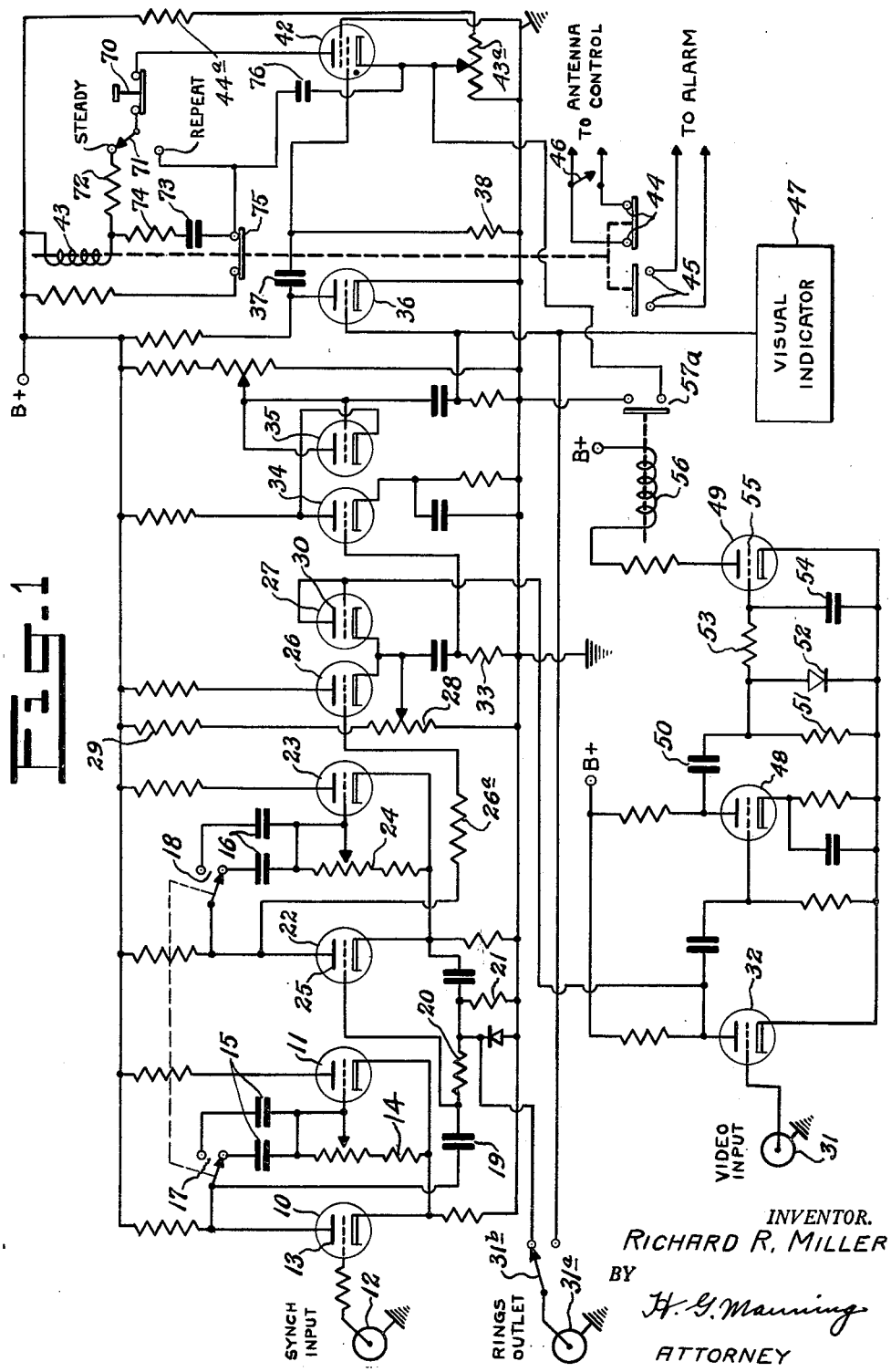

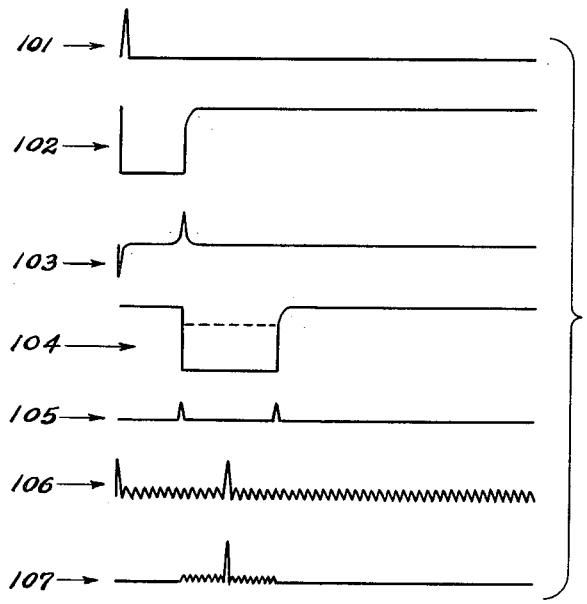
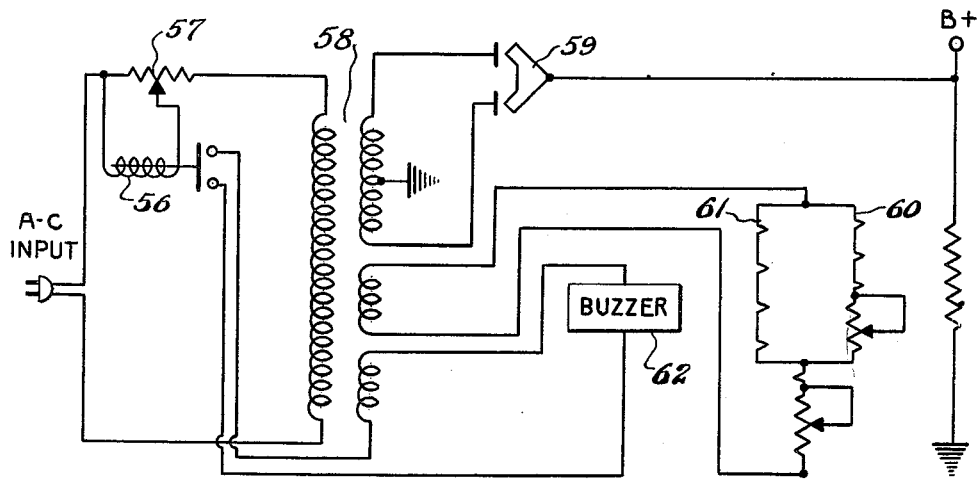

This invention relates to radar alerting devices, and more particularly to an alarm system actuated by echoes within an area of preselected range.

One object of the invention is to provide in a radar system, an alarm actuator including means for differentiating between local identified and insignificant echoes and distant unidentified and significant echoes, and also a selective indicating means for automatically actuating any suitable alarm device.

A further object is to provide an electronic device of the above nature including automatic monitoring means for warning the operator in case the pulse echo system or the monitoring apparatus itself should fail.

A still further object is to provide a radar monitoring device of the character described having means for stopping the moving antenna on target.

A still further object is to provide means for enhancing the signal-to-noise ratio so as to provide greater contrast between the uniform microphonic noise and the significant signals.

A further object is to provide an apparatus of the above nature which will be simple in construction, easily adjustable, inexpensive to manufacture, having high stability and dependability, easy to install and manipulate, compact, and very efficient and durable in use.

With these and other objects in view, there is illustrated on the accompanying drawings one form in which the invention may conveniently be embodied in practice.

In the drawings:

FIG. 1 is a schematic circuit diagram of the invention.

FIG. 2 illustrates graphically, in time-coordinated relation, the voltage impulses effective at various points in the electrical circuit embodying the invention.

FIG. 3 is a schematic circuit diagram of a simplified apparatus for self-monitoring the plate and filament voltage supply unit of the apparatus shown in FIG. 1.

The present invention is an improvement over the apparatus disclosed in my previous Patent No. 2,521,016, dated September 5, 1950, entitled "Radio Pulse Echo Device with Alarm Actuated by Selected Echoes," and the apparatus disclosed in my co-pending application, Serial Number 355,498, filed May 18, 1953, bearing the same title which issued March 7, 1959, as Patent No. 2,878,-465.

The purpose of utilizing a selectively operable automatic alarm in combination with means for continuously monitoring the functioning of a pulse echo system, is to relieve the operator of needless personal attention, and to give warning at the same time if the equipment should for any reason become inoperative during his absence.

The present invention discloses an economical and reliable apparatus for producing these results, and employs the principle of admitting wanted signals, rather than that of excluding unwanted signals. It also results in economy of construction and enhanced stability, characteristics which are most desirable in any monitoring system.

Referring now to the drawings, in which like reference numerals denote corresponding parts throughout the several views, the numerals 10 and 11 indicate a pair of triodes connected in a one-shot multivibrator circuit. The one-shot multivibrator is triggered at the synchronization pulse input 12 by radar transmitter pulses derived from the transmitter of a conventional radar system (not illustrated). These positive synchronization pulses are indicated by the numeral 101 in FIG. 2.

Provision is also made of a pair of triodes 22 and 23 which comprise a second start-stop multivibrator circuit triggered by the positive excursions of the differentiated signals 103 of the square wave output of the first multivibrator comprising triodes 10 and 11.

FIG. 2 shows at 102, the negative square wave pulse generated at the plate 13 of the triode 10, this pulse being of variable duration under control of an adjustable potentiometer 14 and a pair of selectively insertable capacitors 15, 16. The negative pulse 102 is differentiated by means of a capacitor 19 and a pair of series-connected resistors 20 and 21 to produce the negative and positive excursions shown at 103 in FIG. 2.

A pair of ganged switches 17 and 18 serve to permit a "coarse adjustment" of the pulse widths of the multivibrator circuits to conform generally with the pulse repetition frequency of the pulse-echo or radar system with which the device comprising the invention is combined.

The output at the plate 25 of the tube 22 is shown by the graph 104 in FIG. 2. The graph 105 shows the voltage impulses occurring across the resistor 21, said impulses being suitable for injection into the video-amplifying circuit of a pulse echo system indicator unit to produce "range rings" to apprise the operator of the area in which the monitoring device is "keeping watch." This will provide the operator with an efficient and simple means for observing and adjusting the apparatus herein described to the area or zone which he wishes to scrutinize, adjustment being made by means of the potentiometer 14 controlling the inner range limit of the zone, and a potentiometer 24 controlling the outer range limit.

The apparatus cannot generate a square wave longer than the duration of one sweep or cycle of operation since it will be stopped by the negative excursions of the voltage pulses 103. Within the described limits, the multivibrator circuit comprising triodes 22 and 23 can produce a pulse of variable duration adjustable by means of the potentiometer 24, and the selectively insertable capacitors 16.

A pair of triodes 26 and 27 comprise a combination gate and diode pick-off circuit controlled by a voltage-divider potentiometer 28 and a resistor 29. When the plate 25 of the triode 22 is most positive, the triode 26 will conduct heavily, but when the plate 25 of the triode 22 is at its lower value, the triode 26 will be at cut-off, with the result that a negative voltage excursion of the same duration as 104, but of lesser amplitude, will appear at the cathodes of the triodes 26 and 27.

A resistor 26a is used for the purpose of limiting the current flow in the grid circuit of the triode 26 during intervals of conduction in said triode. The amplitude of such gated pulses will be determined by the setting of the potentiometer 28 which determines the fixed voltage bias of the triode 26.

Video signals from the pulse echo system receiver (which are negative at the input 31) are inverted and amplified by the triode 32 and applied at the plate 30 of the triode 27, connected to operate as a diode, causing said triode to conduct when its cathode is comparatively negative, but preventing current flow when said cathode is positive with respect to the plate 30.

It will also be evident from this disclosure that the gating pulse will not appear at the plate 30 of the diode-connected triode 27, or across as resistor 33, because of the pick-off effect of the triode 27 when adjusted at a suitable operating level by the potentiometer 28.

The video signals falling within the zone corresponding to the gating pulse appear across the resistor 33, from which they are applied to the grid of a triode 34, wherein they are inverted and amplified. The amplified signals are then coupled to the diode pick-off circuit comprising a diode-connected triode 35. The output of the diode pick-off circuit is fed to the grid of a triode 36, where the signals are amplified in positive polarity.

One advantage of the present invention is that by the use of the resistance couplings in the amplifier circuits preceding the diode pick-off circuit, the gain characteristics of the vacuum tubes will remain unaltered and undistorted in all sections of the gate pulse. Also a greatly enhanced signal-to-noise ratio of the video signals will be achieved, thus establishing a greater contrast between the above-mentioned constant microphonic noise and the significant amplitude excursions of the above described significant echoes.

Thus, since radar systems are primarily pulse devices, the constant amplitude microphonic noise appearing in the video signals will be insignificant.

The positive signals appearing at the plate of the triode 36 are resistance coupled by a capacitor 37 and a resistor 38 to the grid of thyratron 42, so that, upon occurrence of a positive signal, the thyratron 42 will conduct and close a relay 43 through a normally closed reset switch 70, a steady-repeat switch 71, and a series resistor 72.

When the switch 71 is in the "repeat" position, the illustrated, the thyratron 42 will discharge through the resistor 72 and the relay 43 continuously, until the operator opens the circuit by pressing the reset switch 70.

When the switch 71 is in the "repeat" position, the circuit associated with a capacitor 73 is closed, enabling said capacitor to discharge through the thyratron 42, a resistor 74 and the relay 43, for a time determined by the values of said capacitor 73 and the combined resistances of the resistor 74 and the coil of the relay 43.

During the time that the relay 43 is actuated, a switch 75 of said relay is open-circuited, allowing the plate of the thyratron 42 to drop to a low voltage.

The relay returns to normal upon the expenditure of the charge in the capacitor 73. The switch 75 of the relay 43 places a momentary high voltage charge on the cathode of the thyratron 42 through a capacitor 76, setting said cathode at a potential above that of the plate, thereby extinguishing the thyratron 42. Subsequently, the plate voltage builds up again as the capacitor 73 recharges, and it falls back to a low normal on the cathode as the charge on the capacitor 76 is passed off through the power bias circuit comprising the potentiometer 43a and the resistor 44a. The use of the above-described repeat signal on the alarm device greatly reduces the "irritation factor" of the alarm process.

The series circuit comprising a resistor 44a and a potentiometer 43a together form an adjustable voltage divider circuit adapted for adjustment of the bias of the grid of the thyratron 42. A pair of contacts 44 of the relay 43 will be normally closed, and will maintain the current for the actuation of the pulse echo system antenna. A pair of contacts 45 will normally be open for actuating the alarm means when closed, and a switch 46 is employed for use in case it is not desired to have the antenna stop when the relay is actuated by said target.

A visual indicator unit 47 including a tube of the "magic eye" type provides the means for adjusting the sensitivity of the diode pick-off circuit disclosed above, and also to operate at the upper fringe of microphonic noise shown at 106 (FIG. 2).

A pair of triode tubes 48 and 49 comprise the pulse echo system monitoring circuit which provides a constant supervision of the amplitude of the pulse signals transmitted by said system. Thus, the positive video signal of which one cycle of operation is shown on the graph 106, is coupled to the triode 48, wherein it is amplified and inverted so that it appears as a predominantly negative output, and is clamped by a circuit comprising a capacitor 50, a resistor 51, a rectifier 52, a resistor 53 and a capacitor 54. This combination of components maintains a negative bias potential on the grid 55 of the triode 49 in the presence of the transmitter pulse and other video signals. The failure of these signals will remove this bias from the triode 49 which will energize a relay 56 and will thereby actuate the alarm by firing the thyratron 42 because of removal of its bias upon closure of the contacts 57.

The range rings outlet 31a is adapted to be connected to the radar indicator unit to indicate on the screen thereof the area in which the alarm device is keeping watch. Connection of the associated single-pole double-throw switch 31b to its upper terminal provides the ring indications of the zone limits, and connection to the lower terminal provides a sample of the signal condition in the zone of search.

In FIG. 3, a means for monitoring the power supply of the apparatus is disclosed. At the input of a transformer 58, provision is made of a relay 56, which is normally closed. The relay 56 is shunted by a resistor 57 to cause said relay to open in the presence of a sufficient reduction of current in the transformer 58. Thus, failure of the filament of a rectifier 59, or failure of any filament in either of the series-parallel filament circuits 60 and 61 will sufficiently reduce the load upon the transformer 58 as to cause the relay to return to normal and close the contacts for actuating a signal buzzer 62.

While there has been disclosed in this specification, one form in which the invention may be embodied, it is understood that this form is shown for the purpose of illustration only, and that the invention is not to be limited to the specific disclosure but may be modified and embodied in various other equivalent forms without departing from its spirit. In short, the invention includes all the modifications and embodiments coming within the scope of the following claim.

Having thus fully described the invention, what is claimed as new and for which it is desired to secure Letters Patent is:

In a pulse echo system, means for confining the search range of said system within predetermined limits, detecting means for providing an output signal in response to the occurrence of return echo pulse signals to said system from within said limits, video pulse signal amplitude monitoring means providing an output signal in response to a decrease in transmitted signal amplitude below a predetermined safe value, and alarm means responsive to the said output signals comprising: a thyratron having plate, grid and cathode terminals; said grid being connected to the output of said detecting means whereby reception of a return echo pulse signal will trigger said thyratron; a bias supply, relay operated switch means having a relay coil connected in the plate circuit of said thyratron, means to couple the cathode of said thyratron to the position side of said bias supply to prevent firing of said thyratron and a switch actuated by said relay to energize an alarm when said relay is energized by the firing of said thyratron; adjustable means for selectively controlling the bias on said cathode to prevent the thyratron from firing under conditions other than those specifically predetermined; and means energized in response to the output of said monitoring means for short circuiting said adjustable means to remove the bias from said cathode and fire said thyratron when the amplitude of said video signals decreases below a predetermined safe value, whereby said relay is energized to actuate said switch and energize said alarm.

References Cited in the file of this patent

UNITED STATES PATENTS

| | | |
|---|---|---|
| 2,403,527 | Hershberger | July 9, 1946 |
| 2,409,448 | Rost et al. | Oct. 15, 1946 |
| 2,428,058 | Wise | Sept. 30, 1947 |
| 2,494,339 | Keister | Jan. 10, 1950 |
| 2,533,898 | Robinson et al. | Dec. 12, 1950 |
| 2,609,431 | Faltz | Sept. 2, 1952 |
| 2,712,130 | Sprague | June 28, 1955 |

FOREIGN PATENTS

| | | |
|---|---|---|
| 640,504 | Great Britain | July 19, 1950 |